J. SORENSEN.
BRAKE MECHANISM.
APPLICATION FILED AUG. 12, 1915.

1,188,853.

Patented June 27, 1916.
2 SHEETS—SHEET 1.

Witnesses

Inventor
John Sorensen,
By C. L. Parker,
Attorney

J. SORENSEN.
BRAKE MECHANISM.
APPLICATION FILED AUG. 12, 1915.
1,188,853.
Patented June 27, 1916.
2 SHEETS—SHEET 2.
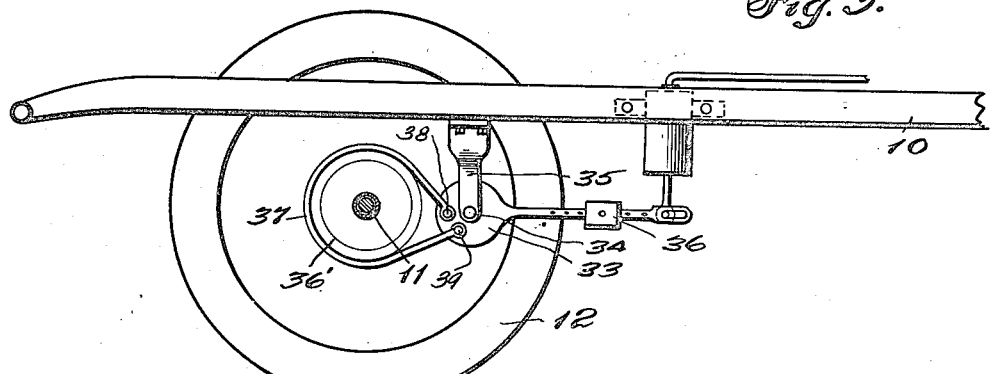
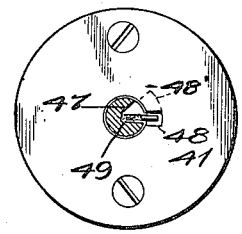
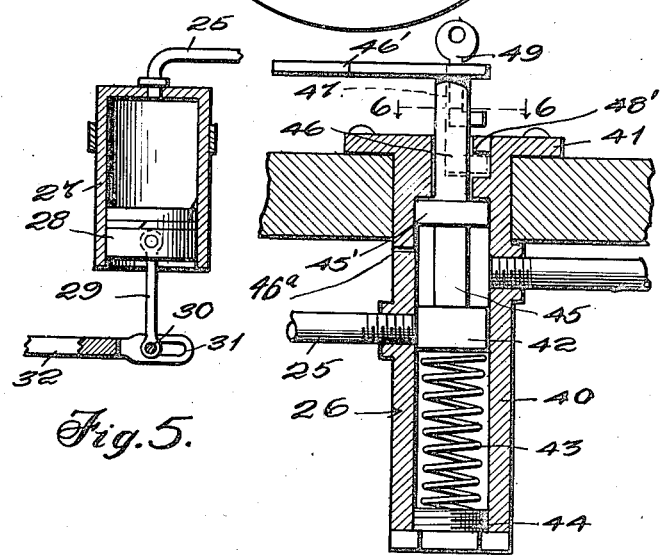
Inventor
John Sorensen,
By C. L. Parker
Attorney
Witnesses

UNITED STATES PATENT OFFICE.

JOHN SORENSEN, OF BROOKLYN, NEW YORK.

BRAKE MECHANISM.

1,188,853.　　　　Specification of Letters Patent.　　Patented June 27, 1916.

Application filed August 12, 1915. Serial No. 45,170.

*To all whom it may concern:*

Be it known that I, JOHN SORENSEN, a citizen of the United States, residing at Brooklyn, in the county of Kings and State of New York, have invented certain new and useful Improvements in Brake Mechanism, of which the following is a specification.

The present invention relates to improvements in brake mechanism, adapted for use upon automobiles, wagons or the like, while not necessarily restricted to this use.

An important object of the invention is to provide brake mechanism of the above mentioned character, which is reliable in operation, convenient in use, and receives its power from a movable element of the vehicle upon which it is mounted.

A further object of the invention is to provide novel and simple means for retaining the brake mechanism set for a desired length of time.

Other objects and advantages of the invention will be apparent during the course of the following description.

Figure 1:
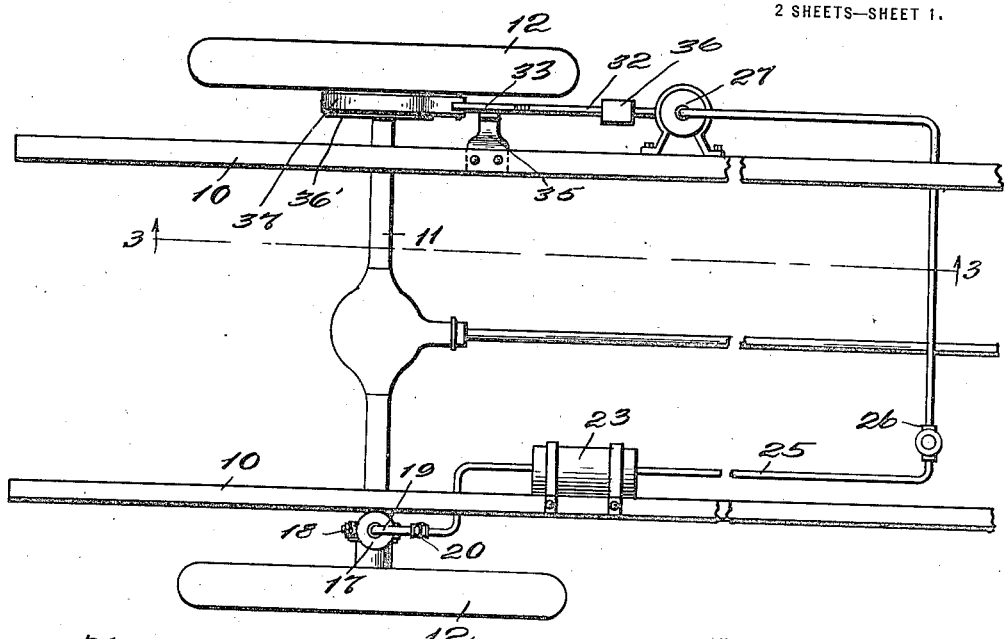
Figure 2:
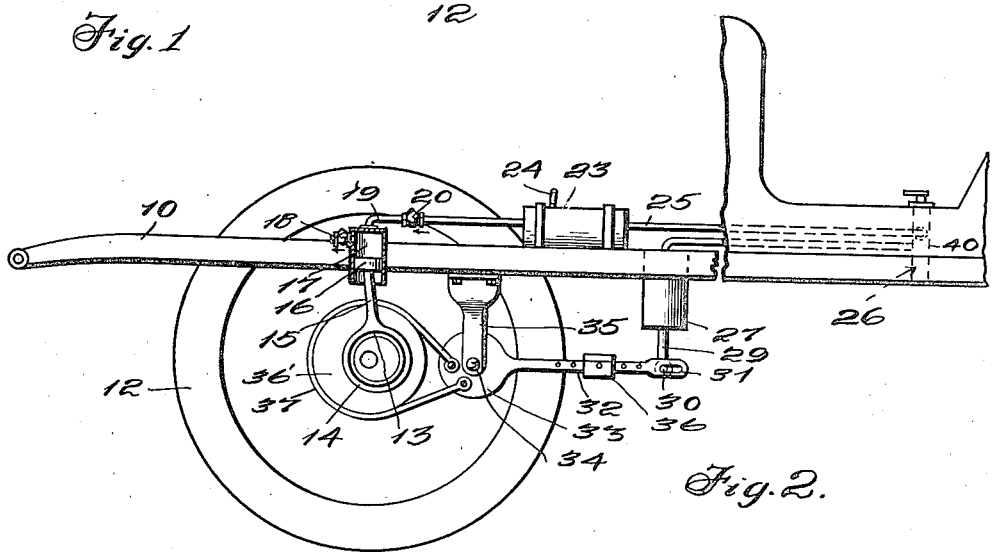

In the accompanying drawings forming a part of this specification and in which like numerals are employed to designate like parts throughout the same, Figure 1 is a plan view of brake mechanism embodying the invention, showing the same applied to the frame of the automobile, Fig. 2 is a side elevation of the same, with one wheel of the automobile removed and certain element or elements in section, Fig. 3 is a longitudinal sectional view taken on line 3—3 of Fig. 1, Fig. 4 is an enlarged detail sectional view through the valve structure, Fig. 5 is a similar view through a cylinder, associated elements being shown in elevation, and, Fig. 6 is a horizontal section taken on line 6—6 of Fig. 4.

In the drawings, wherein for the purpose of illustration is shown a preferred embodiment of my invention, the numeral 10 designates longitudinal beams included in the frame work of an automobile.

The numeral 11 designates the rear axle-casing and the numeral 12 the rear wheels of the automobile.

Arranged preferably upon the inner side of one wheel 12 and secured thereto for rotation therewith is a preferably tubular eccentric 13, having an eccentric strap 14 rotatably mounted thereon. Connected with this eccentric strap is a pitman or rod 15, having a plunger 16 pivotally connected therewith. This plunger is mounted to reciprocate within a cylinder 17, rigidly attached to one beam 10 by any suitable means. The cylinder 17 is provided with an outwardly opening check valve 18. This cylinder and associated elements constitute a vacuum pump, while it is to be understood that any well known or preferred type of vacuum pump may be employed. Connected with one end of the cylinder 17 is a pipe 19, having a check valve 20 connected therein, and opening in the direction of the arrow, as shown. The pipe 19 leads to a vacuum storage tank 23, suitably rigidly secured to the beam 10. This storage tank is preferably provided with an automatic relief valve 24, which may be set for maintaining the vacuum at a predetermined degree within the tank.

A pipe 25 is connected with the tank 23 and has a valve structure 26 connected therein. The specific construction of this valve structure will be stated hereinafter. The pipe 25 is connected with a preferably vertical cylinder 27, rigidly attached to the adjacent beam 10. Mounted to reciprocate within this cylinder is a plunger 28, connected with a depending rod 29. This depending rod carries a transverse pin 30, extending into an elongated slot 31, formed in one end of a vertically swinging lever 32. The lever 32 has a disk or head 33 rigidly connected with its rear end and preferably formed integral therewith. This disk or head is pivotally supported at its center, by a bolt 34, carried by a depending arm or bracket 35, which is rigidly attached to the beam 10. The lever 32 is moved downwardly or returned to its normal position by a weight 36, preferably longitudinally adjustably mounted thereon, as shown.

Secured to the other wheel 12 for rotation therewith is a brake drum 36', surrounded by a brake-band 37. One end of this brake-band is pivotally connected with the disk or head 33, as shown at 38, and its opposite end is pivotally connected therewith, as shown at 39.

As more clearly shown in Fig. 4, the valve structure 26 embodies a preferably vertical casing 40, having its upper end flanged as shown at 41, and secured to the bottom of the automobile. The casing 40 is connected in the pipe 25 or with the portions thereof, and is adapted to establish communication between such portions, as will be explained. Mounted to reciprocate within the casing 40 is a piston-valve 42, adapted when in the upper position to cover the end of the rear portion of the pipe 25, for cutting off communication between the tank 23 and the cylinder 27. This piston-valve 42 is normally held in the upper position by a compressible coil spring 43, the lower end of which engages a plug 44, having screw-threaded engagement within the lower end of the casing 40. The piston-valve 42 has its upper end rigidly connected with a rod 45, to the upper end of which is secured a head 46. The rod 45 also carries a piston-valve 45', slidable within the casing 40, and adapted to limit its upward movement. This piston valve 45' covers a port 46ª, which leads to the atmosphere when piston-valve 42 uncovers pipe 25, or vice versa. The head 46 is mounted to reciprocate within the upper end of the casing 40 and projects upwardly beyond the same for a substantial distance. The piston-valve 42 is lowered by the operator placing his foot upon the head 46, or a pedal 46', which is preferably rigidly attached to its upper end. When the piston-valve 42 moves downwardly it uncovers the end of the rear portion of the pipe 25, thus establishing communication between the two portions of this pipe.

This head 46 is preferably provided with a longitudinal opening or slot 47, substantially triangular in horizontal cross-section and increasing in width outwardly. This opening co-acts with an L-shaped opening 48 formed upon the inner surface of the casing 40, adjacent its upper end, and embodying a horizontal under-cut opening 48'.

The numeral 49 designates a key or L-shaped member, adapted to be inserted through the openings 47 and 48, and when the head 46 is moved to the lower position, to be turned for bringing its horizontal portion into one opening 48', whereby the head 46 is held or locked in the lower position.

The operation of the apparatus is as follows: During the travel of the automobile, the eccentric 13 reciprocates the plunger 16, creating a vacuum within the cylinder 17. This operation withdraws air from the tank 23 for creating a vacuum therein, which is held by the check valve 20. When it is desired to apply the brakes, the head 46 is moved downwardly, for bringing the piston-valve 42 to a position for establishing communication between the two portions of the pipe 25 and lowers piston-valve 45' to cover port 46ª. The tank 23 is then placed in communication with the cylinder 27 and the piston 28 is moved upwardly. This movement of the piston 28 swings the lever 32 upwardly, turning the disk 33 upon its pivot 34. The brake-band 37 is accordingly tightened upon the drum 36', for opposing the rotation of the wheel 12. When it is desired to retain the brakes set for a suitable length of time, the head 46 is held in the lower position by the proper manipulation of the key 49, as hereinabove explained. When pressure is removed from the head 46 the spring 43 moves it upwardly, whereby piston valve 42 covers a portion of pipe 25 and piston-valve 45' uncovers port 46ª. The cylinder 27 is now placed in communication with the atmosphere through the port 46ª, and the vacuum broken therein.

It is to be understood that the form of my invention herewith shown and described is to be taken as a preferred example of the same and that various changes in the shape, size and arrangement of parts may be resorted to without departing from the spirit of the invention or the scope of the subjoined claims.

Having thus described the invention, I claim:

1. In brake mechanism of the character described, a substantially vertical cylinder adapted for connection with the frame of a wheeled vehicle, a plunger mounted to reciprocate within the cylinder, a depending bracket secured to the frame and arranged near the cylinder, a disk pivotally connected with the bracket to turn in a substantially vertical plane, a vertically swinging lever carried by the disk and having pivotal connection with the plunger, a weight carried by the outer end of the lever to swing it downwardly, a brake drum carried by one wheel of the vehicle, and a brake-band surrounding the brake drum and connected with the disk.

2. In brake mechanism of the character described, a brake device, a cylinder, a plunger mounted to reciprocate within the cylinder and connected with the brake device, a conduit connected with the cylinder to vary the pressure therein, a casing connected in the conduit, a piston-valve mounted to reciprocate within the casing, a rod connected with the piston-valve to move it, and means to lock the rod in the lower position.

3. In brake mechanism of the character described, a brake device, a cylinder, a plunger mounted to reciprocate within the cylinder and connected with the brake device, a conduit connected with the cylinder to vary the pressure therein, a casing connected in the conduit and having an L-shaped opening formed upon its inner side, a piston-valve mounted to reciprocate within the casing, a spring to move the piston-valve upwardly, a rod connected with the piston-valve and extending upwardly beyond the casing and having a longitudinal opening formed therein to coöperate with the L-shaped opening, and a key adapted for insertion within said openings to lock the rod in the lower position.

In testimony whereof I affix my signature in presence of two witnesses.

JOHN SORENSEN.

Witnesses:
   JAMES SOLOMON,
   VICTOR SOLOMON.